United States Patent [19]

Ohnaka et al.

[11] 4,063,018

[45] Dec. 13, 1977

[54] PROCESS FOR PREPARING ALKALI METAL SALT OF CARBOXYMETHYL CELLULOSE ETHER

[75] Inventors: Kouichi Ohnaka; Shigeo Yokoi; Takeo Ohmiya, all of Himeji, Japan

[73] Assignee: Daicel Ltd., Sakai, Japan

[21] Appl. No.: 673,211

[22] Filed: Apr. 2, 1976

[30] Foreign Application Priority Data

Apr. 7, 1975 Japan .................................. 50-42012
Apr. 7, 1975 Japan .................................. 50-42013

[51] Int. Cl.² .............................................. C08B 11/00
[52] U.S. Cl. ...................................... 536/98; 106/170; 106/197 C
[58] Field of Search ............................ 536/97, 98, 101

[56] References Cited

U.S. PATENT DOCUMENTS

| 2,447,914 | 8/1948 | Ruperti ................................. 536/101 |
| 2,512,338 | 6/1950 | Klug et al. ............................ 536/97 |
| 2,517,577 | 8/1950 | Klug et al. ............................ 536/98 |
| 2,735,846 | 2/1956 | Richter .................................. 536/101 |
| 3,085,087 | 4/1963 | Henry et al. ........................... 536/98 |
| 3,723,413 | 3/1973 | Chatterjee et al. .................... 536/97 |
| 3,915,959 | 10/1975 | Goheen et al. ....................... 536/101 |

FOREIGN PATENT DOCUMENTS

| 250,478 | 10/1962 | Australia ............................... 536/101 |
| 537,914 | 3/1957 | Canada .................................... 536/98 |
| 1,801,553 | 5/1970 | Germany ............................... 536/98 |
| 729,823 | 5/1955 | United Kingdom .................. 536/101 |

*Primary Examiner*—Ronald W. Griffin
*Attorney, Agent, or Firm*—Blanchard, Flynn, Thiel, Boutell & Tanis

[57] ABSTRACT

An alkali metal salt of carboxymethyl cellulose ether is prepared by dissolving an alkali in a water-containing organic solvent, adding starting cellulose to the solution, stirring the mixture to form a slurry of the alkali cellulose and then reacting it with an etherifying agent. Alternatively, it is prepared by reacting the starting cellulose in a water-containing solvent with sodium monochloroacetate as an etherifying agent, in the presence of an alkali.

19 Claims, 1 Drawing Figure

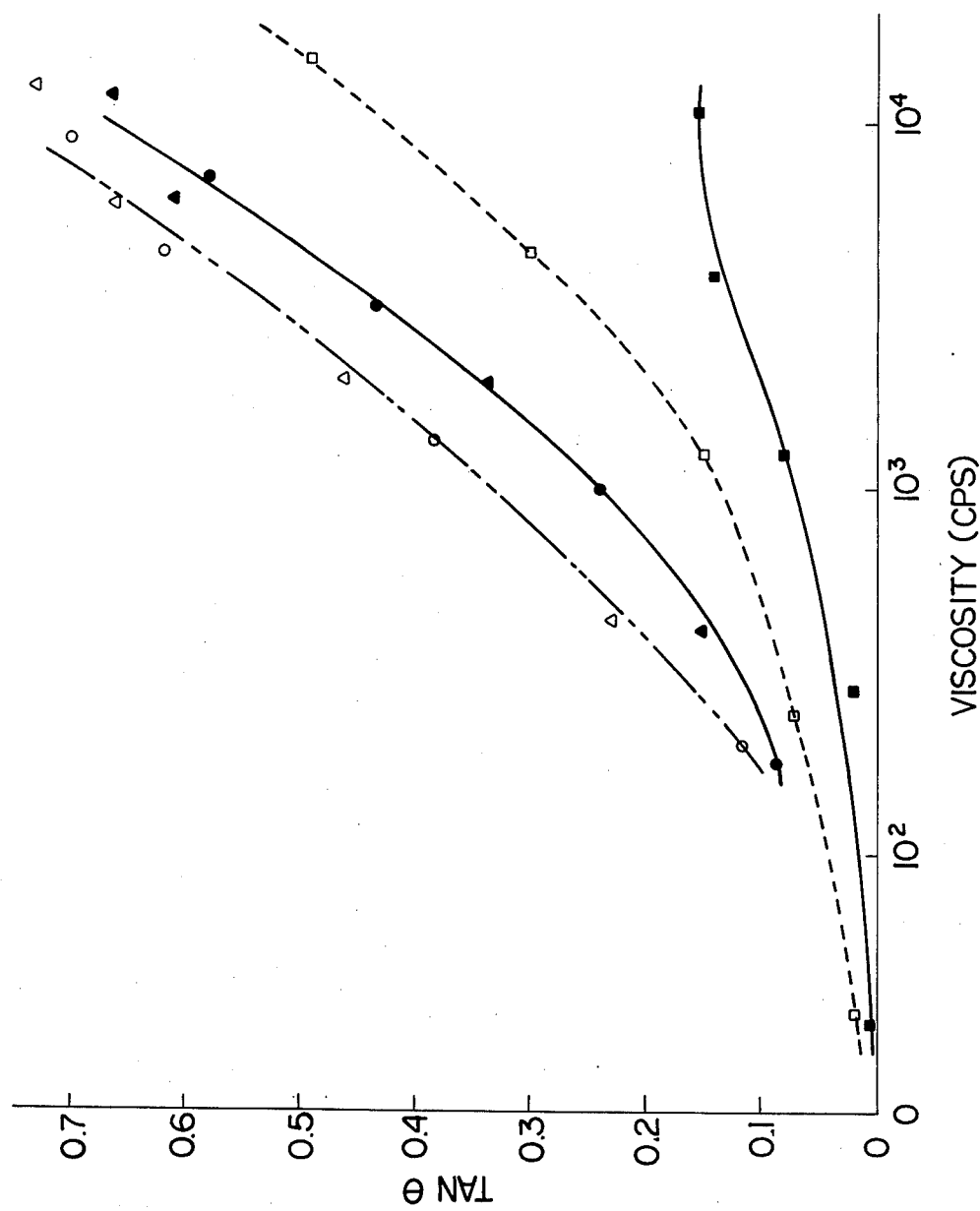

PROCESS FOR PREPARING ALKALI METAL SALT OF CARBOXYMETHYL CELLULOSE ETHER

BACKGROUND OF THE INVENTION

1. Field of the Invention

The present invention relates to a process for the preparation of carboxymethyl cellulose ether alkali metal salts (or alkali metal cellulose glycolates; herinafter referred to as "CMC"). The CMC according to this invention possesses an improved flow property in aqueous solutions thereof and is especially suitable for use in printing pastes.

2. Description of the Prior Art

CMC as a synthetic paste possesses excellent properties such as a thickening property, a suspension-stabilizing property and a film-forming property, and it is widely used in the fiber industry, the food processing industry, the paint industry, the construction material industry, the cosmetic industry, the ceramic industry, the pharmaceutical industry and the agricultural industry, and in drilling muds used in the boring of oil wells and the like. By virtue of its following advantageous properties, CMC is widely used as an ingredient of pasty printing color paste:

1. The CMC paste has little or no reducing property, and therefore, it does not damage the coloring property of a dye and it manifests a good color-reproducing property.
2. The dried film has good physical properties and has a good water retention property, and therefore, run-away is much reduced during the steaming step.
3. The paste can be easily removed by washing after the dyeing step.
4. A stock paste or a dyeing paste can easily be prepared, and the paste has a good compatibility with other pastes.
5. The paste has a high plastic flowability and the past hardly penetrates into the back of the cloth to which it is applied.

In order to have good effects on factors influencing the printing, such as silk-screening, operation, such as the squeeze-parting property, the doctor-parting property, the screen-passing property, the level dyeing and the sharpness of the printed pattern, a printing paste is required to have a moderate plastic flowability. CMC has a relatively high plasticity and is suitable for hand printing such as stencil printing. On the other hand, a printing paste having a high Newtonian flowability is preferred for machine printing such as roller printing and auto-screen printing.

The water medium method for preparing CMC has been practiced for many years, but in this method, the ratio of effective utilization of the etherifying agent (the ratio of (a) the amount of the etherifying agent that becomes bonded to the cellulose, to (b) the amount of the etherifying agent initially charged) is low. As a means for overcoming this disadvantage, a solvent method was proposed by Hayakawa et al (see Japanese patent publication No. 7349/57) as a method characterized by a high effective utilization ratio of monochloroacetic acid used as etherifying agent. In this method, the amount of the solvent is from 2 to 10 times the amount of the cellulose. Watanabe et al proposed a method in which an organic solvent is used in an amount at least 30 times the weight of the cellulose (Kogyo Kagaku Zasshi, 68, 83, 1590 (1965). In this method, a high effective utilization ratio of monochloroacetic acid can be attained, but it is difficult to obtain CMC having a high sliding property.

It is said that the flow characteristics of CMC are generally influenced by the distribution of the substituents introduced by the etherification, and in the above solvent method, attempts have been made to obtain improved flow characteristics by increasing the amount of the alkali added and increasing the degree of substitution. However, in these attempts, the ratio of the amount used of the alkali is increased and the effective utilization ratio of the monochloroacetic acid is reduced, and therefore, the economical advantage inherent in the solvent method is lost.

From experience it was found that the flow characteristics, namely the viscosity characteristics, of CMC are influenced by the manufacturing conditions, but according to conventional techniques, conditions providing CMC having viscosity characteristics satisfying all the requirements of a printing paste have not yet been achieved.

SUMMARY OF THE INVENTION

We have discovered that CMC possessing improved flow properties can be prepared by permeating the reaction reagents in cellulose and that CMC having the desired properties can be obtained either (A) by mercerizing cellulose in a slurry state under agitation and then performing the etherification in that sequence, or (B) by etherifying the starting cellulose in a water-containing organic solvent with sodium monochloroacetate as an etherifying agent, in the presence of a stoichiometric excess of an alkali.

The (A) process of the invention is further characterized by the steps of dissolving an alkali in a water-containing organic solvent present in an amount at least 21 times the amount of the starting cellulose, adding the cellulose to the solution, pulverizing the cellulose in situ in the solvent under high speed shearing to convert the mixture to a slurry, performing alkali mercerization in this state to obtain an alkali cellulose and then etherifying the alkali cellulose by a conventional method.

The product obtained by the process of this invention is suitable for use in a printing paste which possesses good reproducibility of the printing results.

BRIEF DESCRIPTION OF THE DRAWING

The drawing is a graph illustrating the relation between the viscosity and the value of tan Θ of the CMC products obtained in Examples 1 to 3 and Comparative Examples 1 to 3. The data points in the graph are as follows:  : Example 1,   : Example 2,   : Example 3,   : Comparative Example 1    : Comparative Example 2,   : Comparative Example 3.

DETAILED DESCRITPTION OF THE INVENTION

As the solvent that can be used in the present invention, there can be mentioned, for example, alcohols having 2 to 4 carbon atoms, such as ethyl alcohol, n-propyl alcohol, isopropyl alcohol, n-butyl alcohol and isobutyl alcohol, ketones having 3 to 5 carbon atoms, such as acetone and methylethyl ketone, and mixtures of those solvents, and mixtures of one or more of the foregoing solvents with aromatic hydrocarbons having 6 to 8 carbon atoms, such as benzene and toluene. Among these organic solvents, isopropyl alcohol is most preferred because it provides reaction conditions giving a high effective utilization ratio of the etherifying agent, such as sodium monochloroacetate. In order to impart a good compatibility with an alkali and sodium monochloroacetate, water is incorporated into the organic solvent. For example, in the case of isopropyl alcohol, the solvent is used in the state containing 4 to 20% by weight, preferably 7 to 12% by weight, of water. This water-containing organic solvent is used in an amount sufficient to impart a good flowability to the reaction mixture slurry formed after adding the cellulose. More specifically, this condition is satisfied when the water-containing solvent is used in an amount of at least 21 times the weight of the starting cellulose. It is preferred that the weight ratio of the solvent to the starting cellulose not be excessively high. Namely, it is preferred that the solvent be used in an amount of from 21 to 30 times the weight of the starting cellulose.

The amount of each reactant to be employed in the process according to this invention will be described below. In case of the (A) process involving mercerization and subsequent etherification, the amount of the alkali used is varied depending on the desired degree of substitution in the CMC, but it is generally used in an amount of at least 2 moles, preferably 2.1 to 4.0 moles, per mole of monochloroacetic acid or sodium monochloroacetate used in the subsequent etherification. The amount of the etherifying agent used is varied depending on the desired degree of substitution in the CMC, but the etherifying agent is generally used in an amount of from 0.5 to 2.0 moles per mole of the starting cellulose.

In the case of the (B) process including etherification in the presence of an alkali, the amount of sodium monochloroacetate is varied depending on the desired degree of substitution in the CMC, but the etherifying agent is generally used in an amount of from 0.5 to 2.0 moles per mole of the starting cellulose. The alkali is added in an amount at least equimolar to the amount of sodium monochloroacetate. In order to perform alkali mercerization uniformly, it is preferred that the alkali be used in a substantial excess, for example 30 to 200 mole % excess, especially 70 to 140 mole % excess, relative to the number of moles of sodium monochloroacetate.

In practicing the (A) process including mercerization and subsequent etherification, the starting cellulose is added to the water-containing organic solvent in the presence of an alkali in a reaction vessel, and the alkali mercerization is carried out at 0° to 45° C. A high speed shearing agitation apparatus is disposed in the reaction vessel, and during the alkali mercerization step, the starting cellulose is sufficiently pulverized and agitated under wet grinding conditions. This is a critical requirement of the (A) process of the present invention. The particular high speed shearing apparatus employed is not particularly critical, provided that the sheet-like, film or chip-like starting cellulose is sufficiently pulverized and transformed to a slurry of the starting cellulose in the water-containing solvent present in an amount of from 21 to 30 times the weight of the starting cellulose. For example, a high speed agitator having shearing propeller blades or a pulverizing agitator having a crushing ability can be used.

In the (A) process of the present invention, in order to attain sufficient permeation of the alkali into the cellulose and to advance the reaction uniformly, it is necessary that the alkali mercerization should be carried out simultaneously with the pulverization of the starting cellulose. For this purpose, the alkali in the required amount is dissolved in the water-containing organic solvent, and the starting cellulose is added to the solution and the alkali mercerization is conducted simultaneously with the pulverization of the cellulose.

The starting cellulose to be used in the process of this invention, either A or B, generally comprises simple fibers having the length of 1 to 30 mm, preferably 3 to 10 mm.

Monochloroacetic acid (or sodium monochloroacetate), as an etherifying agent, is added to the thus-obtained alkali cellulose, and the temperature is elevated above 50° C, to less than 100° C, generally to 60° to 80° C, and the etherification is conducted, whereby CMC is obtained. In this etherifying step, the amount of the etherifying agent is varied depending on the desired degree of substitution of CMC and the amount of the alkali present in the reaction mixture. Any suitable method can be adopted for addition of the etherifying agent. In the etherifying step, good results are obtained if the etherifying agent is sufficiently mixed with the alkali cellulose and the reaction is conducted uniformly between them. Also for this purpose, it is preferred that the alkali cellulose be in a slurry state having good flow characteristics. In general, the etherification is conducted by mixing the etherifying agent with the flowable slurry under agitation by a kneader or a propeller-type agitator.

As described in the Examples and Comparative Examples given hereinafter, when the etherification is conducted under the same conditions, the flow characteristics of the resulting CMC are greatly influenced by the alkali mercerization conditions, and when the alkali mercerization is carried out according to the process of the present invention, CMC having excellent flow characteristics and low thixotropic characteristics and being characterized by high transparency and reduced microfibers or gels can be obtained. According to our experiments, it was confirmed that CMC having as good properties as CMC prepared according to the process of the present invention, namely, CMC excellent in the flow characteristics, thixotropic characteristics, transparency and reduced formation of microfibers and gels, cannot be obtained by a method in which pulverized cellulose is added to a water-containing organic solvent and is formed into a slurry and an alkali is added to this slurry to effect alkali mercerization. This will readily be understood from the results of the Comparative Examples given hereinafter. As will be understood from the foregoing description, the present invention is characterized by the above-mentioned specific alkali mercerization step, and the etherification step is not particularly critical in the (A) process of the present invention and conventional procedures can be used.

The procedures for practicing the (B) process including the step of etherification in the presence of an alkali will now be described.

An alkali and sodium monochloroacetate are added to a water-containing organic solvent in a reaction vessel, and the mixture is sufficiently agitated and previously pulverized cellulose is added thereto. In the resulting slurry, alkali mercerization and etherification are conducted more or less simultaneously. It is also possible to employ a method in which the cellulose is pulverized under high speed shearing agitation, like the (A) process, in the presence of a water-containing organic solvent including therein the alkali and sodium monochloroacetate and during this pulverization alkali mercerization and subsequent etherification are conducted. Further, there can be effectively adopted a method in which, instead of adding sodium monochloroacetate in the water-containing organic solvent, monochloroacetic acid is reacted with a molar excess of an alkali to form sodium monochloroacetate in the water,containing organic solvent.

The mixture of the cellulose, alkali and sodium monochloroacetate is maintained at 0° to 45° C for 30 to 120 minutes. It is believed that the alkali mercerization mainly occurs in this stage. Then, the reaction mixture is maintained at a temperature higher than 50° C, and less than 100° C, generally 60° to 80° C, for 60 to 240 minutes. It is believed that during this stage the etherification mainly occurs.

It is believed that according to the process of the present invention, CMC suitable as a printing paste is obtained for the following reasons:

1. In the method in which etherification is conducted by adding monochloroacetic acid to alkali cellulose, since excess alkali is present in the vicinity of the cellulose when monochloroacetic acid is added, the etherification of the cellulose competes with the salt forming reaction of the alkali with monochloroacetic acid, and therefore, the etherification often advances only partially. If sodium monochloroacetate is used according to the present invention, since the acid has already been converted to the salt by neutralization, the reaction of the alkali with the cellulose alone is conducted homogeneously.

2. In the process of the present invention, uniform permeation of sodium monochloroacetate into the cellulose is promoted by swelling of the cellulose by the alkali.

Further, partial advance of the reaction is advantageously inhibited by the fact that the cellulose is treated in the form of a slurry having a good flowability.

The present invention will now be described by reference to the following Examples. The obtained CMC was evaluated according to the following methods.

1. Viscosity

The viscosity was measured at 25° C by using a BL type viscometer (manufactured by Tokyo Keiki) and a rotor No. 2, rotated at 60 rpm, with respect to a 1 wt.% aqueous solution of CMC. The viscosity of a concentrated aqueous solution (having a viscosity of about 100,000 cps) was measured at 25° C by using a BH type viscometer (manufactured by Tokyo Keiki) and a rotor No. 6, rotated at 10 rpm.

2. Microfiber (fibrous insoluble matter observed when CMC is dissolved in water)

The number of microfibers in a 1% aqueous solution of CMC was examined by the naked eye.

3. Gel (half-dissolved, swollen material observed when CMC is dissolved in water)

A 0.5% aqueous solution of CMC was charged in a 300 ml capacity beaker and the number of gel particles CMC materials adhering to the glass wall was examined and evaluated according to the following scale:

| Number of Gels | Evaluation Rating |
| --- | --- |
| 0 – 10 per 4 cm² | A |
| 11 – 20 per 4 cm² | B |
| 21 – 50 per 4 cm² | C |
| > 51 per 4 cm² | D |

4. Transparency

A 1% aqueous solution of CMC was charged in a glass tube having an inner diameter of 24 mm, and a white-black striped pattern of a stripe width of 1 mm was viewed through the bottom of the glass tube. The maximum distance (mm) at which the stripes could be distinguished was measured.

5. Elasticity

In the case of a printing paste, the printing operation and results are influenced by not only the property expressed as the viscosity under specific speed shearing, but also the elastic behavior. We found that the elasticity of a CMC aqueous solution is very important. This property was measured according to the following method:

A concentrated aqueous solution of CMC (having a concentration of 6 to 9 wt.%) was prepared so that the viscosity was about 100,000 cps, and 500 ml of the solution was charged into a beaker having an inner diameter of 55 mm. A cylinder having a diameter of 15.5 mm was suspended vertically so that it could rotate freely in the horizontal direction and it was immersed in the sample solution at a depth of 50 mm. Then, the cylinder was rotated ½ rotation during a period of 1 second, and the rotation was stopped. At this point, owing to the elasticity of the CMC solution, the cylinder was moved in the reverse direction. The return angle at this point was measured as a factor indicating the elasticity. The elasticity was evaluated according to the following scale:

| Return Angle | Elasticity |
| --- | --- |
| 0 – 15° | A |
| 15 – 30° | B |
| > 30° | C |

6. Printing Test

An 8 wt.% aqueous solution of CMC was used as the base paste. To 65 parts of the base paste were added 2.0 parts of Dianix Brown 2B-FS (disperse dye manufactured by Mitsubishi Kasei), 1.0 part of Glyesine A, 1.5 parts of Resistat (reduction-preventing agent) and 30.5 parts of water for dilution and they were mixed to form a color paste. A Tetron taffeta was printed by placing thereon a screen (150 mesh) having a wedge pattern and a spiral pattern and applying the color paste through the screen. Then, the fabric was dried, steamed at 130° C for 30 minutes, soaped and washed with water. The printing adaptability of the paste was evaluated according to the following scale:

| Mark | Printing Adaptability |
| --- | --- |
| O | especially good pattern sharpness without color unevenness |
| Δ | moderate |
| X | poor |

5. Sliding and Thixotropic Properties

An aqueous solution of CMC has a lower viscosity when it is flowed than when it is kept stationary. When the flowed solutions become stationary again, the original viscosity is restored. Namely, they have a thixotropic property but lack a sliding property (Newtonian flow characteristics). The degree of the sliding property can be quantitatively determined by the value of tan $\theta$ which is obtained according to the following method. In a duallogarithmic graph, the shearing speed (the rotation speed of the BL viscometer) is plotted on the X axis and the viscosity at each shearing speed is plotted on the Y axis. The obtained data are plotted on the graph to obtain a straight line. The gradient $\theta$ of the line is determined and the value of tan $\theta$ is used for evaluating the sliding property. A lower value of tan $\theta$ shows a better sliding property.

EXAMPLES 1 to 3

A stainless steel reaction vessel, having a capacity of about 100 l and equipped with a pulverizer having a shearing blade capable of rotation at about 800 rpm, was charged with 750 l (about 610 Kg) of a 90 wt.% aqueous solution of isopropyl alcohol and a prescribed amount (listed in Table 1) of a 70 wt.% aqueous solution of sodium hydroxide. While agitation was being conducted, 25 Kg of sheet-form starting cellulose (having a water content of 6 wt.%) was added to the contents of the reactor over a period of 5 minutes. The cellulose was pulverized in the reaction vessel to form a slurry, and the temperature was adjusted at 15° C and agitation was continued for 60 minutes to effect alkali mercerization. Then the slurry was transferred to a reaction vessel equipped with a propeller-type agitator, and a prescribed amount (listed in Table 1) of a solution of monochloroacetic acid in an equal amount of isopropyl alcohol was added. The reaction mixture was agitated for 20 minutes, and the temperature was elevated and the etherification was conducted at 70° C for 120 minutes. After completion of the reaction, the reaction mixture was cooled to 45° C and the excess sodium hydroxide was neutralized with acetic acid. The liquid was removed by a centrifugal separator, and the recovered product was washed two times with a 75% aqueous solution of methanol, followed by liquid removal and drying, to obtain CMC.

COMPARATIVE EXAMPLES 1 to 3

The same reaction vessel as used in Examples 1 to 3 was charged with 750 l (610 Kg) of a 90 wt.% aqueous solution of isopropyl alcohol, and while agitation was being conducted, 25 Kg of sheet-like pulp (having a water content of 6 wt.% was added over a period of 5 minutes. Agitation was continued for 60 minutes to pulverize the pulp and to form a slurry having a good flowability. Then a 70% aqueous solution of sodium hydroxide was added over a period of 10 minutes. Agitation was further continued at 15° C for 60 minutes to obtain an alkali cellulose. Then, etherification and post treatments were conducted in the same manner as in Examples 1 to 3 to obtain CMC. Procedures conducted after the alkali mercerization were the same as those employed in Examples 1 to 3.

The results of the evaluation of the CMC products obtained in Examples 1 to 3 and Comparative Examples 1 to 3 are shown in Table 1 and the accompanying drawing. The CMC products obtained in Examples 1 to 3 were unexpectedly superior in comparison with the CMC products obtained in corresponding Comparative Examples 1 to 3, with respect to the degree of substitution, transparency and reduction of formation of microfibers and gels. The presence of gels and microfibers exerts bad influences on various factors in the printing operation, such as the screen-permeating property, the squeeze-parting property and the doctor-parting property, and is an obstacle to obtaining a sharp print pattern. In the CMC products obtained in Examples 1 to 3, these defects were highly ameliorated. In general, the value of tan $\theta$ employed as a criterion indicating the sliding property depends on the viscosity. When compared, based on the same viscosity, the CMC products obtained in Examples 1 to 3 had smaller values of tan $\theta$ than the CMC products obtained in Comparative Examples 1 to 3, and it was found that the CMC products obtained in Examples 1 to 3 possessed an excellent sliding property.

Table 1

| | Starting Cellulose | | Amount (Kg) of Sodium Hydroxide | Amount (Kg) of Monochloroacetic Acid | Properties of CMC | | | | |
|---|---|---|---|---|---|---|---|---|---|
| | Average Degree of Polymerization | Amount Added (Kg) | | | Degree of Substitution | Transparency (mm) | Viscosity (cps) | Microfibers | Gels |
| Example 1 | 730 | 25 | 14.20 | 14.90 | 0.83 | above 450 | 179 | few | A |
| Example 2 | 730 | 25 | 19.40 | 20.85 | 1.02 | above 450 | 35 | few | A |
| Example 3 | 1200 | 25 | 14.35 | 15.10 | 0.83 | above 450 | 1876 | few | A |
| Comparative Example 1 | 730 | 25 | 14.20 | 14.90 | 0.83 | 400 | 246 | many | C |
| Comparative Example 2 | 730 | 25 | 19.40 | 20.85 | 1.20 | above 450 | 37 | many | C |
| Comparative Example 3 | 1200 | 25 | 14.35 | 15.10 | 0.83 | above 450 | 2020 | many | C |

| | Viscosity (cps) | | | | | |
|---|---|---|---|---|---|---|
| | 0.5 % Aqueous Solution | 1.0% Aqueous Solution | 2.0% Aqueous Solution | 3.0% Aqueous Solution | 4.0% Aqueous Solution | 5.0% Aqueous Solution |
| Example 1 | | 179 | 1020 | 3230 | 7035 | |
| Example 2 | | 35 | 285 | 1210 | 3878 | 10649 |
| Example 3 | 403 | 1876 | 6015 | 11900 | | |
| Comparative Example 1 | | 246 | 1340 | 4280 | 8850 | |
| Comparative Example 2 | | 37 | 240 | 1250 | 4400 | 14500 |
| Comparative Example 3 | 425 | 2020 | 6030 | 12250 | | |

| | tan$\theta$ | | | | | |
|---|---|---|---|---|---|---|
| | 0.5% Aqueous Solution | 1.0% Aqueous Solution | 2.0% Aqueous Solution | 3.0% Aqueous Solution | 4.0% Aqueous Solution | 5.0% Aqueous Solution |
| Example 1 | | 0.09 | 0.24 | 0.44 | 0.58 | |
| Example 2 | | 0.01 | 0.02 | 0.08 | 0.14 | 0.15 |

Table 1-continued

|  |  |  |  |  |  |
|---|---|---|---|---|---|
| Example 3 | 0.22 | 0.34 | 0.61 | 0.66 |  |
| Comparative Example 1 |  | 0.13 | 0.38 | 0.62 | 0.70 |
| Comparative Example 2 |  | 0.02 | 0.07 | 0.15 | 0.30 | 0.49 |
| Comparative Example 3 | 0.23 | 0.46 | 0.66 | 0.73 |  |

EXAMPLES 4 to 7 and Comparative Example 4

Alkali mercerization, etherification, liquid removal, washing and drying were carried out by using the same apparatus and employing the same procedures as described in Example 1, except that the amount of the aqueous solution of isopropyl alcohol was changed within the range of 21 to 30 times the amount of the starting cellulose (Examples 4 to 7).

In Comparative Example 4, the amount of the aqueous solution of isopropyl alcohol was 18 times the amount of the starting cellulose.

The results obtained in Examples 4 to 7 and Comparative Example 4 are shown in Table 2. The CMC products obtained in Examples 4 to 7 were unexpectedly improved in comparison with the product obtained in Comparative Example 4 with respect to the transparency and sliding property.

Table 2

| | Starting Cellulose | | Amount (Kg) of Monochloroacetic Acid | Weight Ratio (times) of Water-Containing Solvent to Starting Cellulose | Fluid State of Slurry |
|---|---|---|---|---|---|
| | Average Degree of Polymerization | Amount Added (Kg) | Amount (Kg) of Sodium Hydroxide | | | |
| Example 4 | 730 | 25 | 17.45 | 18.75 | 21 | substantially flowable |
| Example 5 | 730 | 25 | 17.45 | 18.75 | 24.5 | good flowability |
| Example 6 | 730 | 25 | 17.45 | 18.75 | 26 | " |
| Example 7 | 730 | 25 | 17.45 | 18.75 | 28.5 | " |
| Comparative Example 4 | 730 | 25 | 17.45 | 18.75 | 18 | not flowable |

| | Properties of CMC | | | | | tan θ | | |
|---|---|---|---|---|---|---|---|---|
| | degree of substitution | transparency (mm) | viscosity (cps) | microfibers | gels | 1% Aqueous Solution | 3% Aqueous Solution | 5% Aqueous Solution |
| Example 4 | 0.91 | 245 | 68 | moderate | B | 0.02 | 0.24 | 0.47 |
| Example 5 | 0.88 | above 450 | 81 | few | A | 0.03 | 0.26 | 0.40 |
| Example 6 | 0.87 | above 450 | 82 | few | A | 0.01 | 0.23 | 0.43 |
| Example 7 | 0.90 | above 450 | 90 | few | A | 0.03 | 0.27 | 0.49 |
| Comparative Example 4 | 0.86 | 125 | 65 | many | C | 0.03 | 0.39 | 0.67 |

EXAMPLES 8 to 16

In a 2 liter capacity separable flask equipped with an agitator there were charged 1500 ml (1220 g) of a 90 wt.% aqueous solution of isopropyl alcohol, and prescribed amounts of sodium hydroxide and sodium monochloroacetate were added thereto to dissolve them in the solution. While maintaining an agitation speed of 200 rpm and a solution temperature of 30° C, 50 g of cellulose powder (having an average degree of polymerization of 730 and a water content of about 6 wt.%) was added to the solution, and the cellulose was treated at a prescribed temperature within a range of 15° to 45° C (defined as the alkali mercerization temperature) for 60 minutes. Then, the temperature was elevated to 70° C and the reaction was conducted at this temperature for 120 minutes. Then, the reaction mixture was cooled to 45° C and acetic acid was added in an amount sufficient to neutralize the excess sodium hydroxide. The liquid was removed from the resulting CMC slurry, and the recovered CMC was washed two times with a 75% aqueous solution of methanol. The liquid was removed and the CMC was dried and pulverized.

The concentration of the aqueous solution of isopropanol used, the alkali mercerization temperature, the amounts of sodium hydroxide and sodium monochloroacetate used, and the properties of the obtained CMC are shown in Table 3.

EXAMPLES 17 AND 18

The same apparatus as used in Examples 8 to 16 was charged with 150 ml (1220 g) of a 90 wt.% aqueous solution of isopropyl alcohol, and sodium hydroxide was added thereto. While maintaining an agitation speed of 200 rpm and a solution temperature of 30° C, 50 g of cellulose powder was added to the solution, and the reaction was conducted at 30° C under agitation for 60 minutes. Then, sodium monochloroacetate was added to the reaction mixture and the mixture was blended at 30° C for 20 minutes. Then, the temperature was elevated to 70° C and the reaction was conducted at that temperature for 120 minutes, and then in the same manner as described in Example 8, neutralization, liquid removal, washing and drying were conducted. The reaction conditions and the properties of the obtained CMC are shown in Table 3.

COMPARATIVE EXAMPLE 5

The same apparatus as used in Examples 8 to 16 was charged with 1500 ml (1220 g) of a 90 wt.% aqueous solution of isopropyl alcohol, and sodium hydroxide was incorporated and dissolved in the solution. While maintaining an agitation speed of 200 rpm, 50 g of cellulose powder was added to the solution and the alkali mercerization was carried out at 30° C for 60 minutes. Then a solution formed by dissolving monochloroacetic acid in isopropyl alcohol (about 1 : 1, parts by weight)

was added at a rate of 10 ml/min and after completion of the addition, the mixture was agitated for 20 minutes. Then, the temperature was elevated to 70° C and etherification was conducted for 120 minutes at that temperature. The post treatments were conducted in the same manner as described in Example 8. The reaction conditions and the properties of the obtained CMC are shown in Table 3. The results of an evaluation of a commercially available CMC product A are also shown in Table 3. by dissolving monochloroacetic acid in isopropyl formed by dissolving monochoroacetic acid in isopropyl alcohol (about 1 : 1, parts by weight) was added at a rate of 10 ml/min and after completion of the addition, the mixture was agitated for 20 minutes. Then, the temperature was elevated to 70° C and etherification was conducted for 120 minutes at that temperature. The post treatments wer conducted in the The elasticity of the aqueous solution of CMC, to which great importance was attached in evaluating products obtained in Examples 8 to 18 and Comparative Example 5 and commercially available product A, was found to have a close relation with the printing test result, and it was found that CMC obtained according to the process of the present invention is very suitable for printing.

Kg of sheet-like pulp (the cellulose having an average degree of polymerization of 730 and a water content of about 6 wt.%) was charged over a period of 5 minutes. The alkali mercerization was conducted at 30° C for 60 minutes under pulverization. Then the resulting slurry reaction mixture was transferred into a reaction vessel equipped with agitation propellers rotatable at about 120 rpm, and the etherification was conducted at 70° C for 120 minutes. After completion of the reaction, the reaction mixture was cooled to 45° C and the excess sodium hydroxide was neutralized with acetic acid and liquid removal was carried out by a centrifugal separator. The recovered CMC was washed with 375 Kg of a 75% aqueous solution of methanol, followed by liquid removal and drying, to obtain CMC.

EXAMPLES 20 to 23

By using the same apparatus and starting material as used in Example 19, the reaction was carried out in the same manner as described in Example 8 except that sodium monochloroacetate was not used but it was formed in the reaction vessel by adding monochloroacetic acid and a molar excess of sodium hydroxide to the reaction vessel prior to feeding of the pulp. Post treatments were conducted in the same manner as described in Example 19.

COMPARATIVE EXAMPLE 6

In the same apparatus as used in Example 19, sodium hydroxide was dissolved in 750 l of a 90 wt.% aqueous solution of isopropyl alcohol. Then 25 Kg of sheet-like cellulose pulp (having an average degree of polymeriza-

EXAMPLE 19

A stainless steel reaction vessel having a capacity of about 1000 liters and equipped with a pulverizer having a shearing blade rotatable at about 800 rpm was charged with 760 l (610 Kg) of a 90 wt.% aqueous solution of isopropyl alcohol, sodium hydroxide and sodium monochloroacetate. While agitation was being continued, 25

Table 3

| Example No. | Alkali Merceriza- tion Temperature (° C) | Isopropanol Concentration (%) | Amounts Added (mole/glucose unit, $C_6$) | | Method of Addition of Etherifying Agent |
|---|---|---|---|---|---|
| | | | Sodium Hydroxide for Alkali Mercerization | Etherifying Agent | |
| 8 | 30 | 90 | 2.11 | 1.05 | Simultaneous addition of alkali and sodium monochloracetate |
| 9 | 30 | 90 | 1.48 | 0.74 | " |
| 10 | 30 | 90 | 1.22 | 0.93 | " |
| 11 | 30 | 90 | 0.98 | 0.89 | " |
| 12 | 30 | 90 | 3.85 | 1.29 | " |
| 13 | 15 | 90 | 1.52 | 0.89 | " |
| 14 | 45 | 90 | 1.64 | 0.97 | " |
| 15 | 30 | 92 | 1.45 | 0.73 | " |
| 16 | 30 | 88 | 1.45 | 0.73 | " |
| 17 | 30 | 90 | 1.45 | 1.81 | sodium monochloroacetate was added to alkali cellulose |
| 18 | 30 | 90 | 2.11 | 1.05 | " |
| Comparative Example 5 | 30 | 90 | 1.50 | 0.71 | Monochloroacetic acid was added to alkali cellulose |
| Commercially Available Product A | — | — | — | — | — |

| Example No. | Properties of CMC | | | | | | |
|---|---|---|---|---|---|---|---|
| | substitution degree | viscosity (cps) | transparency (mm) | microfiber | gel | elasticity | printing test |
| 8 | 0.61 | 44 | >450 | moderate | A | O | O |
| 9 | 0.55 | 79 | >450 | " | B | O | O |
| 10 | 0.70 | 40 | 300 | " | C | Δ | Δ |
| 11 | 0.60 | 35 | 50 | many | D | Δ | Δ |
| 12 | 0.62 | 59 | >450 | moderate | A | Δ | Δ |
| 13 | 0.60 | 36 | >450 | " | B | Δ | Δ |
| 14 | 0.60 | 68 | 280 | " | C | Δ | Δ |
| 15 | 0.55 | 13 | 350 | few | B | Δ | Δ |
| 16 | 0.57 | 53 | >450 | few | A | O | O |
| 17 | 0.56 | 62 | >450 | few | B | O | O |
| 18 | 0.62 | 59 | >450 | few | A | O | O |
| Comparative Example 5 | 0.61 | 89 | 48 | many | D | X | X |
| Commercially Available Product A | 0.60 | 65 | 150 | moderate | C | Δ | Δ | tion of 730 and a water content of about 6 wt.%) was added to the solution over a period of 5 minutes. The alkali mercerication was carried out at 30° C for 60 minutes while it was pulverized, and a solution of monochloroacetic acid in isopropyl alcohol was added and after completion of the addition, the mixture was agitated for 20 minutes. Then the temperature was elevated to 70° C and the etherification was carried out at that temperature for 120 minutes. Post treatments were conducted in the same manner as described in Example 19.

The reaction conditions in Examples 19 to 23 and Comparitive Example 9 and properties of the products are shown in Table 4.

starting cellulose. The reaction conditions and the properties of the obtained products are shown in Table 5. It was found that in order for the reaction mixture slurry to have a good flowability, it is critical that the amount of the reaction solvent should be at least 21 times the weight of the cellulose, and that if the amount of the solvent is smaller than 21 times the weight of the cellulose, CMC having good properties cannot be obtained.

Table 5

| Example No. | Alkali Mercerization Temperature (° C) | Isopropyl Alcohol Concentration (%) | Amounts Added (moles per glucose unit, $C_6$) | | Amount of Water-Containing Solvent to Cellulose (times) |
|---|---|---|---|---|---|
| | | | sodium hydroxide for alkali mercerization | sodium monoacetate | |
| 24 | 30 | 90 | 2.00 | 1.00 | 21 |
| 19 | 30 | 90 | 2.00 | 1.00 | 24 |
| 25 | 30 | 90 | 2.00 | 1.00 | 26 |
| 26 | 30 | 90 | 2.00 | 1.00 | 28.5 |
| Comparative Example 7 | 30 | 90 | 2.00 | 1.00 | 18 |

| | | Properties of CMC | | | | | |
|---|---|---|---|---|---|---|---|
| Example No. | Flow State of Slurry at Alkali Mercerization | degree of substitution | transparency (mm) | viscosity (cps) | microfiber | gel | elasticity |
| 24 | substantially fluid | 0.61 | 180 | 73 | moderate | C | Δ |
| 19 | good flowability | 0.58 | 360 | 66 | few | B | O |
| 25 | " | 0.59 | >450 | 52 | few | A | O |
| 26 | " | 0.60 | 400 | 63 | few | B | Δ |
| Comparative Example 7 | not fluid | 0.57 | 35 | 71 | many | D | X |

Table 4

| Example No. | Alkali Mercerization Temperature (° C) | Isopropanol Concentration (%) | Amounts Added (moles per glucose unit, $C_6$) | | Method of Addition of Etherifying Agent |
|---|---|---|---|---|---|
| | | | Sodium hydroxide for alkali mercerization | etherifying agent | |
| 19 | 30 | 90 | 2.00 | 1.00 | sodium monochloroacetate was added |
| 20 | 30 | 90 | 1.45 | 0.86 | sodium salt was formed from monochloroacetic acid |
| 21 | 30 | 90 | 2.00 | 1.00 | " |
| 22 | 30 | 88 | 1.52 | 0.89 | " |
| 23 | 30 | 88 | 2.08 | 1.04 | " |
| Comparative Example 6 | 30 | 90 | 1.55 | 0.71 | monochloroacetic acid was added to alkali cellulose |

| | Properties of CMC | | | | | |
|---|---|---|---|---|---|---|
| Example No. | degree of substitution | viscosity (cps) | transparency (mm) | microfiber | gel | elasticity |
| 19 | 0.58 | 44 | >450 | few | A | O |
| 20 | 0.62 | 66 | 360 | few | B | O |
| 21 | 0.62 | 78 | >450 | few | A | O |
| 22 | 0.67 | 75 | 365 | few | B | O |
| 23 | 0.59 | 57 | >450 | few | A | O |
| Comparative Example 6 | 0.54 | 82 | 200 | many | D | X |

EXAMPLES 24 TO 26 AND COMPARITIVE EXAMPLE 7

By using the same apparatus as used in Example 19, CMC was prepared by the same procedures employed in Example 19, while changing the amount of the aqueous solution of isopropyl alcohol added to the pulp as indicated below. In each of Examples 24 to 26, the amount of the solvent was at least 21 times the weight of the starting cellulose, but in Comparative Example 7, the amount of the solvent was 18 times the weight of the

What is claimed is:

1. A process for preparing an alkali metal salt of carboxymethyl cellulose, which comprises the steps of: dissolving a water-soluble alkali in a solvent mixture of isopropanol and water to obtain a liquid alkaline mercerization medium, then adding non-pulverized cellulose to said mercerization medium in an amount such that the weight of said mixture of isopropanol and water is from 21 to 30 times the weight of said cellulose, subjecting the mixture of cellulose and said mercerization medium to high speed shearing and wet grinding to pulverize the cellulose in situ in contact with the mercerization medium to obtain a slurry of cellulose in said mercerization medium and continuing said high speed shearing and wet grinding while maintaining said slurry at from about zero to 45° C for from about 30 to 120 minutes to transform said cellulose in said slurry to an alkali cellulose, and then adding monochloroacetic acid or sodium monochloroacetate to said slurry and mixing it therein under conditions effective to transform said alkali cellulose to an alkali metal salt of carboxymethyl cellulose ether, and then recovering said alkali metal salt of carboxymethyl cellulose ether from the reaction mixture.

2. A process according to claim 1, in which said solvent mixture contains from 4 to 20 percent by weight of water.

3. A process according to claim 1 in which said alkali is sodium hydroxide.

4. A process according to claim 3 in which the amount of said alkali is from 2 to 4 moles, per mole of the monochloroacetic acid or sodium monochloroacetate.

5. A process according to claim 4 in which the amount of said monochloroacetic acid or sodium monochloroacetate is from 0.5 to 2.0 moles, per mole of the cellulose.

6. A process according to claim 4 in which the etherifying reaction is carried out at more than 50° and less then 100° C for from 60 to 240 minutes.

7. A process for preparing an alkali metal salt of carboxymethyl cellulose, which comprises the steps of: dissolving a water-soluble alkali and sodium monochloroacetate in a solvent mixture of isopropanol and water to obtain a liquid alkaline mercerization and etherification medium containing from 0.5 to 2.0 moles of sodium monochloroacetate per mole of the hereinafter mentioned cellulose and in which the amount of said water-soluble alkali is at least equimolar to the amount of said sodium monochloroacetate; then adding non-pulverized cellulose to said medium in an amount such that the weight of said mixture of isopropanol and water is from 21 to 30 times the weight of said cellulose and subjecting the mixture of cellulose and said medium to high speed shearing and wet grinding to pulverize the cellulose in situ in contact with the mercerization medium to obtain a slurry of cellulose in said medium and continuing said high speed shearing and wet grinding while maintaining said slurry at from about zero to 45° C for from about 30 to 120 minutes to transform said cellulose in said slurry to an alkali cellulose, and then heating the slurry to more than 50° C and less than 100° C and agitating the slurry at the latter temperature for from about 60 minutes to 240 minutes to transform said alkali cellulose to an alkali metal salt of carboxymethyl cellulose, and the recovering said alkali metal salt of carboxymethyl cellulose, from the reaction mixture.

8. A process according to claim 7 in which the amount of said water-soluble alkali is from 30 to 200 mole percent excess, relative to the number of moles of said sodium monochloroacetate.

9. A process according to claim 7 in which the amount of said water-soluble alkali is from 70 to 140 mole percent excess, relative to the number of moles of said sodium monochloroacetate, and the second-named temperature range is from 60° to 80° C.

10. A process for preparing an alkali metal salt of carboxymethyl cellulose, which comprises the steps: dissolving in a solvent mixture of isopropanol and water (1) a water-soluble alkali and (2) sodium monochloracetate, to form a solution in which the amount of said water-soluble alkali is at least equimolar to the amount of said sodium monochloracetate; adding pulverized cellulose to said solution to form a slurry containing from 21 to 30 parts by weight of said solvent mixture per one part by weight of said pulverized cellulose, said slurry also containing from 0.5 to 2.0 moles of sodium monochloroacetate per mole of said cellulose; agitating said slurry while maintaining same at a temperature of from about zero to 45° C for about 30 to 120 minutes to effect alkali mercerization of said cellulose; and then raising the temperature of the slurry to more than 50° and less than 100° C and maintaining the slurry at the latter temperature for from 60 to 240 minutes to transform said cellulose to an alkali metal salt carboxymethyl cellulose then recovering said alkali metal salt carboxymethyl cellulose from the slurry.

11. A process according to claim 10, in which said solvent contains from 4 to 20 percent by weight of water.

12. A process according to claim 10, in which said alkali is sodium hydroxide.

13. A process according to claim 12 in which the amount of said alkali is from 1.3 to 3.0 moles, per mole of the sodium monochloroacetate.

14. A process according to claim 13 in which the amount of sodium monochloroacetate is from 0.5 to 2.0 moles, per mole of cellulose.

15. A process according to claim 10 in which the amount of said alkali is from 1.3 to 3.0 moles, per mole of said sodium monochloracetate.

16. A process according to claim 10 in which the amount of said alkali is from 1.7 to 2.4 moles, per mole of said sodium monochloroacetate and the second-named temperature range is from 60° to 80° C.

17. A process for preparing an alkali metal salt of carboxymethyl cellulose, which comprises the steps: dissolving a water-soluble alkali in a solvent mixture of isopropanol and water to form a solution in which the amount of said water-soluble alkali is at least equimolar to the amount of sodium monochloracetate added in the subsequent step set forth below; adding pulverized cellulose to said solution to form a slurry containing from 21 to 30 parts by weight of said solvent mixture per one part by weight of said pulverized cellulose, agitating said slurry while maintaining same at a temperature of from about zero to 45° C for about 30 to 120 minutes to effect alkali mercerization of said cellulose; and then adding sodium monochloroacetate to the slurry in an amount of from 0.5 to 2.0 moles of sodium monochloracetate per mole of said cellulose and raising the temperature of the slurry to more than 50° and less than 100° C and maintaining the slurry at the latter temperature for from 60 to 240 minutes to transform said cellulose to an alkali metal salt of carboxymethyl cellulose; and then recovering said alkali metal salt of carboxymethyl cellulose from the slurry.

18. A process according to claim 17 in which the amount of said alkali is from 1.3 to 3.0 moles, per mole of said sodium monochloracetate.

19. A process according to claim 17 in which the amount of said alkali is from 1.7 to 2.4 moles, per mole of said sodium monochloroacetate and the second-named temperature range is from 60° to 80° C.

* * * * *